Figure 1:
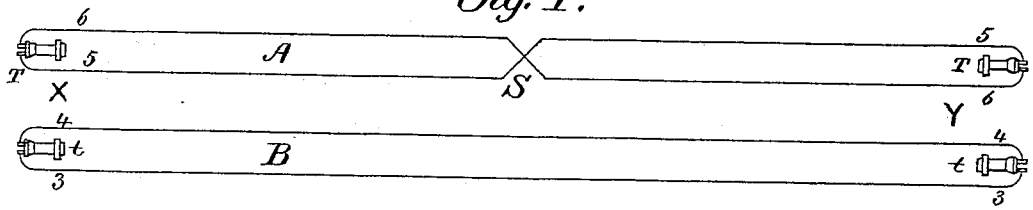

(No Model.) 3 Sheets—Sheet 1.

J. A. BARRETT.
ELECTRIC CIRCUIT.

No. 392,775. Patented Nov. 13, 1888.

Witnesses.
Geo. Willis Pierce
Philip Mauro

Inventor.
John A. Barrett by
A. Pollok his attorney (No Model.) 3 Sheets—Sheet 2.

J. A. BARRETT.
ELECTRIC CIRCUIT.

No. 392,775. Patented Nov. 13, 1888.

Fig. 5ª

Witnesses.
Geo. Willis Pierce,
Philip Mauro

Inventor.
John A. Barrett
by A. Pollok his attorney (No Model.)  3 Sheets—Sheet 3.

J. A. BARRETT.
ELECTRIC CIRCUIT.

No. 392,775. Patented Nov. 13, 1888.

Witnesses.
Geo. Willis Pierce.
Philip Mauro.

Inventor,
John A. Barrett, by
A. Pollok,
his attorney.

UNITED STATES PATENT OFFICE.

JOHN A. BARRETT, OF BROOKLYN, NEW YORK, ASSIGNOR TO THE AMERICAN TELEPHONE AND TELEGRAPH COMPANY, OF NEW YORK.

ELECTRIC CIRCUIT.

SPECIFICATION forming part of Letters Patent No. 392,775, dated November 13, 1888.

Application filed May 9, 1888. Serial No. 273,303. (No model.)

*To all whom it may concern:*

Be it known that I, JOHN A. BARRETT, of Brooklyn, in the county of Kings and State of New York, have invented certain Improvements in the Construction of Electric Circuits, of which the following is a specification.

This invention relates to the neutralization and elimination of induction between parallel electric circuits, and is especially adapted for use in telephony.

It is well known that two electric circuits can be so placed in relation to each other that the currents induced in either by electrical changes in the other shall flow in opposite directions in different parts of the circuits, and so neutralize each other. Thus in telephone and telegraph circuits the direct and return wires of a circuit between two points may be insulated by a suitable non-conducting covering and twisted together, so that the average distance of one from the disturbing-circuit shall be the same as that of the other. This condition may be secured with uncovered wires, as in aerial or pole-supported lines, by crossing the direct and return wires of a circuit at several different points, so that they are in the aggregate at an equal distance from any disturbing parallel conductor.

The object of my invention is to so arrange a number of metallic electric circuits that each shall be relieved from any disturbing effects of the others.

The expedient of completely insulating and twisting the two wires of the several circuits is practically inapplicable to wires separately supported on poles, while my invention is especially applicable to pole-lines, irrespective of the number which are grouped together.

While a series of double-wire telephone-circuits suspended together upon the same poles may be assumed to be neutral or substantially induction-proof with respect to a single-wire circuit or a series of single-wire circuits, (since it would not be difficult to so arrange all the metallic circuits that both the direct and return wire should be practically equidistant from each of a series of single-wire circuits,) they are by no means free from mutual induction and consequent disturbance, each metallic circuit inducing upon the other metallic circuits which are adjacent thereto, for it is obvious that induction is exercised as readily between any two metallic circuits as between any two single-line or earth-return circuits unless the two wires of one of the metallic circuits be so placed as to influence the wires of the other circuit equally and oppositely. Each circuit of a group of several electric circuits having thus been freed from external adverse influence by the provision of parallel return-wires, it remains now so to arrange them that each metallic circuit shall be also freed from the disturbing influence of the others.

This invention provides an effectual means for the neutralization of induction between parallel metallic electric circuits. It also provides a uniform and simple system of construction of such parallel metallic circuits, whereby with a minimum amount of transposition of the wires each circuit is placed practically in an inductively-neutral position with respect to all of the other and neighboring circuits, whatever the number of circuits comprised in the group. This is accomplished, first, by certain transpositions of the wires of the whole or a part of the circuits, as hereinafter described, so as to render the said circuits inductively neutral to each other, and, secondly, by the interposition between any two circuits which might otherwise act upon one another inductively of one or more circuits neutral to them, and, if more than one, to each other.

Figure 2:
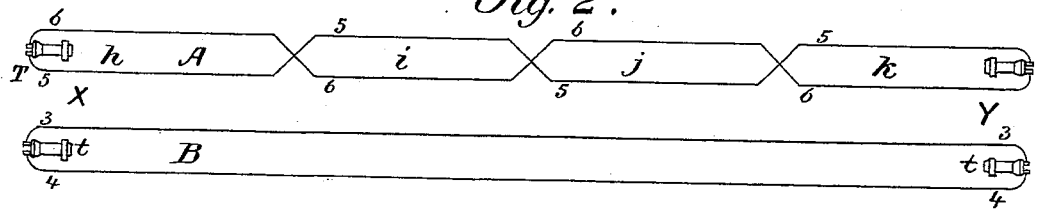
Figure 3:
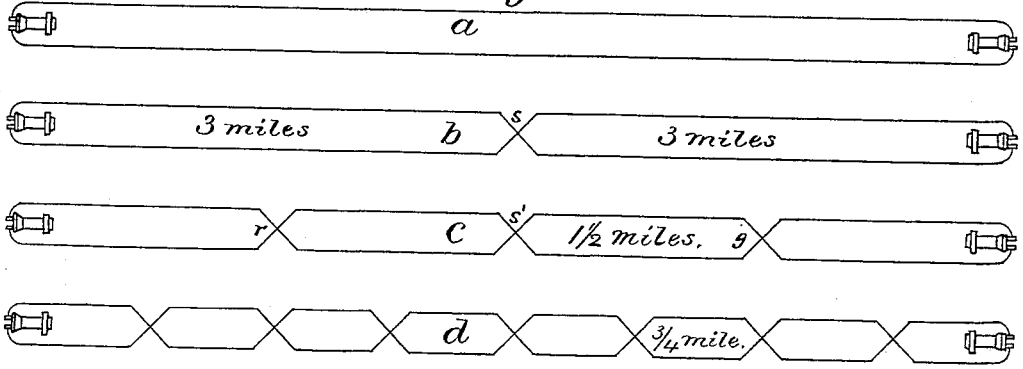
Figure 4:
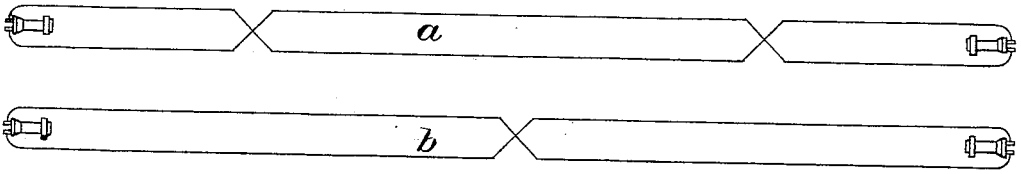
Figure 5:
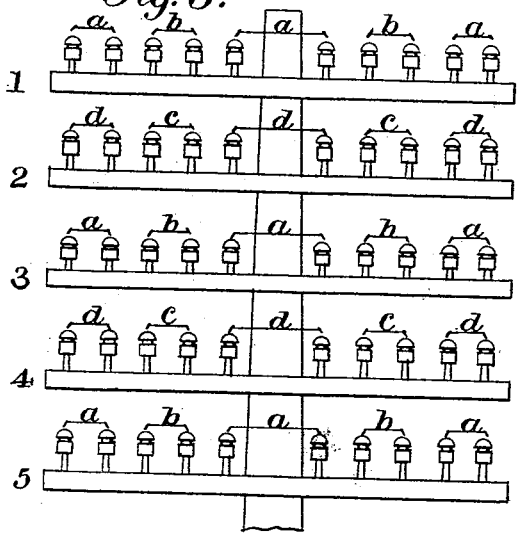
Figure 6:
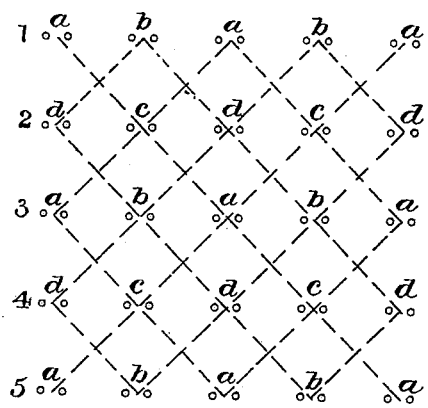
Figure 6:
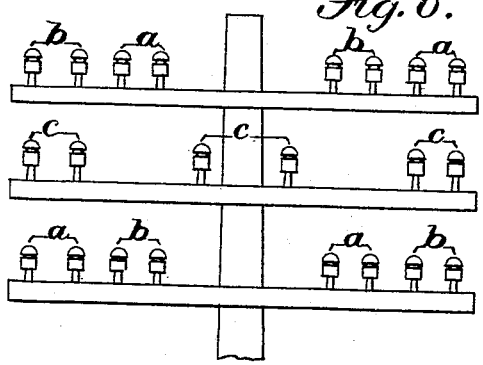
Figure 7:
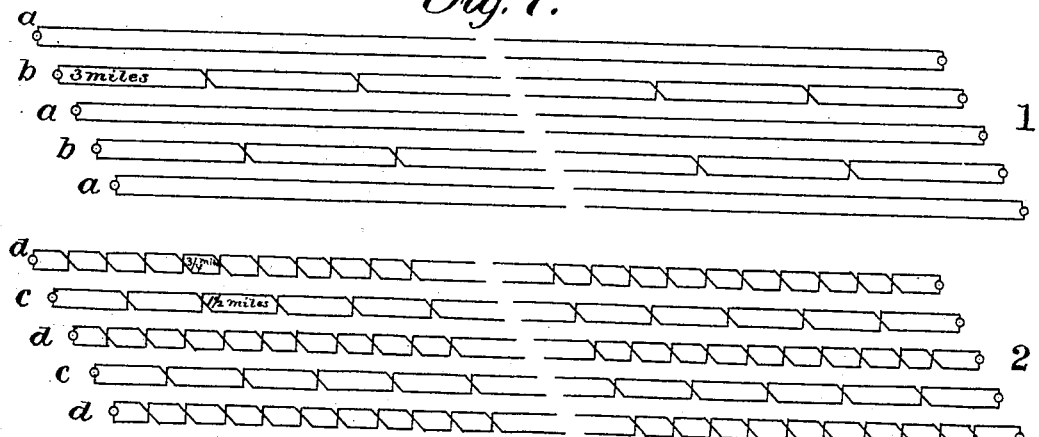

In the drawings which illustrate and form a part of this specification, Figures 1, 2, and 3 are diagrams illustrating the various conditions which render several lines neutral to each other. Fig. 4 is an additional diagram further illustrating another arrangement for the same purpose. Fig. 5 shows an embodiment of this system in a pole-line. Fig. 5ᵃ is a diagram illustrating the principle utilized in grouping the several metallic circuits on the poles or supports. Fig. 6 represents another example of practical application. Fig. 7 is a plan view of the two differently-arranged cross-arms of the pole-line illustrated in Figs. 5 and 5ᵃ, the two combinations of classes being for convenience of description shown independently of one another; and Figs. 8 and 9 exemplify practically and symbolically extensions or modifications of the principle I employ for use under modified conditions.

Before describing with reference to the drawings the system of arranging telephone-circuits which I have invented I desire to recognize and acknowledge the state of the art by declaring that I am aware that metallic circuits with parallel direct and return wires in close proximity to one another have heretofore been used, and that attempts have been made to render such circuits neutral with respect to one another by twisting the two wires of each circuit, as well as the several circuits of a series, continuously round one another, as described in *Telegraphy*, a text-book by Preece and Sivewright, third edition, London, 1884, pp. 293 and 294. It is, however, obvious that wires can only be successfully arranged upon such a plan when but few in number. More than three or four circuits so arranged would be so confusing to the eye of the lineman that it would be almost impossible to trace any line when a fault is being sought; and, moreover, it is doubtful whether it would be possible to arrange a greater number in such a manner on account of the increased risk of crosses and other faults.

In the system which I have devised it will first be observed that each metallic circuit remains upon its own pair of insulators throughout the whole length of the line, so that a repairer can never meet more than ordinary difficulty in tracing any special circuit.

Referring to the diagram Fig. 1, A and B are parallel telephone metallic circuits, 5 and 6 being the direct and return wires, and T representing the telephones at the terminal stations of A, while 3 and 4 are the two wires of B, and $t$ the telephones located thereon. At a point, S, about the middle of the line a crossing may be made between the wires of one of the circuits—say A—the wire 6 being brought into the position with reference to B previously occupied by 5, and 5 being placed in the former line of 6. The line B is preferably left uncrossed or direct. In this case, if electrical variations of uniform potential from one end, X, of the line to the other, Y, could be established through either circuit, the transposed relations of the two sides of circuit A as regards circuit B would constitute a balance of electrical induction, and neither circuit would in practice interfere with the other, because, as is evident, the currents induced between B and one half of A would be neutralized by equal but opposite currents induced between B and the other half of A; but in practice it is found that while this relative arrangement certainly diminishes the mutual induction and consequent interference it does not entirely obliterate it, and this is due mainly to the well-known fact that in any system of electrical circuits the electrical potential is greatest at the source of electricity and falls regularly and in direct proportion to the resistance of the circuit to the point most distant from the said source, where it reaches a value of zero.

In electric circuits such as we are considering the zero potential is at that end of the circuit which at any given moment is receiving, and the highest potential is of course at the transmitting-station. Since, therefore, the potential gradually diminishes through both sides of the circuit from the transmitting to the receiving station, we see that a stronger inducing force is exerted between the circuits A and B in the half-circuit nearest to the end— say X—which at any moment is transmitting than can be exerted in the half beyond the transposition and nearest to the receiving end Y. A perfect balance is therefore not so far attained.

It has been found that by multiplying transpositions, or by introducing them at more frequent intervals, as illustrated in Fig. 2, (in which the letters of reference correspond with those employed in Fig. 1,) the differences of potential from section to section being less, the practical conditions for the successful and non-interfering operation of both circuits approximate more nearly the inductive balance which is desired, and the interference is greatly reduced. This will be seen by denoting the several sections into which circuit A is divided (by the several transpositions respectively) by the letters $h, i, j$, and $k$. The induction between $h$ and B is of course the strongest; but the induction between the next section, $i$, and B (the wires 6 and 5 being now crossed) is nearly as strong, and is in fact stronger than in the third section, $j$, where, a second crossing having occurred, the wires 6 and 5 are once more in their first position, the induction between $j$ and B being in like manner stronger than that between $k$ and B, and so on as far as the crossings continue. Of course, when station X ceases to transmit and station Y at the other end of the line begins to transmit, the several positions are reversed.

Under ordinary conditions it is found that by interposing between any two circuits which are not inductively neutral to each other a circuit neutral to both the said two circuits are substantially freed from reciprocal disturbance, and this is due to the fact that the interposed circuit being acted upon by the circuit upon either side sets up counter-currents which oppose and neutralize in the circuit on the other side the currents induced therein by the first. The interposed circuit thus serves practically as a screen by which either of its flanking circuits is protected from being disturbed by the other. It is conceivable, however, that as the length of lines is increased more powerful transmitters may be required, in which case it is obvious that the inductive power of the said transmitters will also be increased. In this event, and especially if many lines be operated, the arrangement shown in Figs. 8 and 9 will be preferable, in which two or more circuits are interposed between any two mutually-inductive circuits, the said interposed circuits being, as in the former case, inductively neutral to both.

If a line of but two circuits be constructed, the arrangement described in connection with Fig. 2 would afford an adequate neutralization; but it is evident that many cases will arise where a greater number of circuits will be required, and, based upon the principles which I have enunciated, I have devised a system which, while as simple as the exigencies of the case will admit, is capable of indefinite expansion without further complication. This system is diagrammatically indicated in Fig. 3, and its application in actual practice is shown in Figs. 5, 5ᵃ, 6, and 7.

As indicated in Figs. 3, 5, 5ᵃ, and 7, the unit-circuit $a$ is preferably left direct or untransposed, while its adjacent circuit, $b$, on the same horizontal plane, or in practice on the same cross-arm, as shown in Figs. 5 and 7, may be transposed at intervals of, say, three miles between the terminal stations, or for as great a distance from such termini as may be found necessary, and by reference to Figs. 5, 5ᵃ, and 7 it will be seen also that the metallic circuit on the other side of circuit $b$, and occupying the fifth and sixth insulators on the same cross-arm, may be also left direct. I have therefore designated this circuit also as $a$. The fourth circuit in turn on the same cross-arm is constructed with the three-mile transpositions, being in this respect a duplicate of $b$, while the fifth again is straight, and in fact this system of alternating straight or direct and regularly-transposed circuits, provided that all of the circuits are in line with one another in any direction, may be carried out indefinitely. The straight circuits may all be indicated by the letter $a$, and the circuits which are transposed at regular intervals—say of three miles—may all be indicated by the letter $b$.

Let it be understood that the top cross arm, I, has now been described, although, except for descriptive purposes, it is immaterial, and the foregoing description applies with equal correctness to the third or fifth cross-arms, counting downward; but if more than one cross-arm be required it is evident that there are still a number of diagonal exposures to induction where, if the foregoing system be carried out without modification, there will be either no transposition or else two transpositions occurring substantially at the same point. This will be made evident by an examination of the drawings, wherein, if $c$ were left altogether uncrossed, it would be in a reciprocally-inductive position to $a$, while if crossed exactly as $b$ it would, while neutral with respect to $a$, be reciprocally inductive with respect to $b$. If, then, the circuits diagonally exposed to induction be near enough to each other, there will certainly be mutual induction varying in intensity according to the distance between them. To counteract this, another part of my invention is essential. Considering the addition of the cross-arm 2, the diagonal exposures are at once noted. If the cross-arm 2 were alone, it would be necessary only to arrange its circuits in the manner already described. Adding but one circuit, $c$, immediately below $b$, we find that its inductive relations to $b$ are exactly similar with those held by $a$ with respect to $b$, and if $b$ only were mounted on cross-arm I it would not be necessary to transpose $c$ at all; but we cannot ignore the straight circuit $a$ on the left side of $b$ or the straight circuit $a$ on the right side of $b$ and the fact that both, being diagonal to $c$ and in near proximity thereto, are in inductive relation therewith. In such cases it is clear that we cannot leave $c$ straight, as induction would then take place between it and its neighbors in diagonal lines, which are likewise uncrossed, and on the other hand we cannot make its transpositions identical with those of $b$, or induction would occur between it and $b$; but by treating such circuits as indicated at $c$, Figs. 3 and 7, with an extra transposition intermediate between the transpositions of $b$, thus dividing it into sections of one mile and a half each, the induction in or due to $c$ both with respect to the circuits $a$ and $b$ is practically removed, $c$ being now astatic or neutral to both $a$ and $b$.

Very good results would be obtained even though all of the circuits upon cross-arm 2 were transposed as in $c$, and the cross-arms might then be arranged as in Fig. 6; but the results are greatly superior and the system more perfect when the alternate circuits on this cross-arm, also, are likewise individually considered. Referring, therefore, to such circuits $d$ as alternate on the same horizontal plane with the circuits $c$, these are arranged in the present instance in the same vertical plane with the circuits $a$. They occupy the same position with reference to the circuits $a$ inductively as is occupied also by the circuits $b$. Consequently, if $a$ and $d$ could be considered without reference to the other lines, it would obviously be sufficient to transpose $d$ exactly in the same way as $b$ is transposed; but to obtain the best results we cannot ignore the circumstance that circuits in the positions marked $d$ are not only exposed to inductions in vertical planes from the circuits $a$, but also to induction in a horizontal plane from the circuits $c$ and to diagonal induction from the circuits $b$. We must therefore compensate for each of these by transposing the circuits $d$ still further at intervals of three-quarters of a mile in the manner indicated by Figs. 3 and 7. This done, it is evident that the induction between any one of the four series of circuits and the circuits having vertical, horizontal, or diagonal inductive relations therewith is thus substantially neutralized, the induction being balanced, for it is clear that in case any two lines have once been treated as $a$ and $b$, Fig. 3, the relations of these lines is not altered if $a$ is transposed as in Fig. 4; and, referring once more to Fig. 3, it will be seen that $b$ is made neutral with respect to $c$ by crossing its wires at $s$, and that $c$ is made neutral to $a$ by crossing at $s'$, and then made neutral also with respect to $b$ by further crossing at $r$ and $g$, and a consideration of the case as now presented will show that the same principle may be carried out to an indefinite extent irrespective of the number of wires which are carried upon the supports, as in Fig. 5, for example, the addition of a third cross-arm with five more metallic circuits does not alter the relations. No further attention is therefore required, all of the circuits $a$ on cross-arm 3 being precisely in the same position with regard to the circuits $b$ on their own cross-arms and with circuits $c$ and $d$ on cross-arm 2 as are the circuits on cross-arm 1, &c., and, as also indicated in Fig. 5, this principle may further be extended to any reasonable number of cross-arms, (five being shown,) and each class of circuit always occupies the same relation to every other class, for as indicated by the dotted lines of diagram Fig. 5ª, all of the circuits of class $a$ have invariably like relations to circuits of class $b$, $d$, and $c$, and so likewise with respect to each class.

It is to be noted that horizontally circuits of class $a$ preferably alternate with circuits of class $b$, and that circuits of class $d$ alternate with those of class $c$, that perpendicularly $a$ alternates with $d$, and $c$ with $b$, while diagonally $a$ alternates with $c$, and $b$ with $d$. Thus a limited number of classes of crossing are made to answer for an unlimited number of circuits.

Fig. 7 shows the arrangement of the several circuits when transposed as described, each of the series 1 and 2 representing the cross-arms of like number. As the additional cross-arms produce no further change, it is not necessary to show others. The cross-connections are made to best advantage on the poles, and at such poles a good way of effecting the said cross-connections is to attach double cross-arms and to bridle the wires in a manner well understood by those skilled in the art of electrical construction, bringing the wire to the insulator on one of the parts of the double cross-arm and crossing it to the insulator of the other wire on the other part of the cross-arm.

I do not of course restrict myself to the precise arrangement described and shown in the specification and drawings, since other arrangements will readily suggest themselves to persons familiar with electrical circuits; and I may, without departing from the principle of my invention, modify in several ways the arrangement herein shown. I may, for example, reverse the relative position of the wires $a$ and $b$ on one cross-arm and correspondingly reverse the positions of $c$ and $d$ on the next; or, leaving $a$ and $b$ as shown, I may reverse the circuits $c$ and $d$ with respect to one another only; or I may place the cross-arm carrying the $d$ and $c$ wires at the top and that carrying the $a$ and $b$ circuits immediately below; or, again, I may, if I so elect, reverse the positions of $a$ and $c$ or $b$ and $d$. In all such cases, however, the governing principle of my invention is employed—namely, that of compensating for induction between a series of parallel circuits by arranging the said circuits in such a way that each is rendered neutral with respect to any other of the group or series, whether such other circuits be in a vertical, horizontal, or a diagonal direction therefrom, this being effected as between any two circuits by crossing the two wires of one at suitable points opposite parallel or uncrossed portions of the other, whereby the two wires of the one are maintained in the aggregate at an equal distance, respectively, from the two wires of parallel portions of the other, and by reducing the necessary number of such crosses by interposing between such circuits as are otherwise mutually inductive with respect to one another one or more inductively-neutral circuits; nor do I restrict myself to the distances between transpositions which I have mentioned herein, it being plain that the distances given are purely illustrative, and may be varied with the conditions which affect or control the degree of inductive interference existing between the respective circuits of any group. In telephonic circuits the strength of current developed by the transmitters used, the length of the distances of exposure to inductive influences up to certain limits, and the degree of quietness desired are the conditions to be estimated in determining the length of the sections between transpositions.

Figure 8:
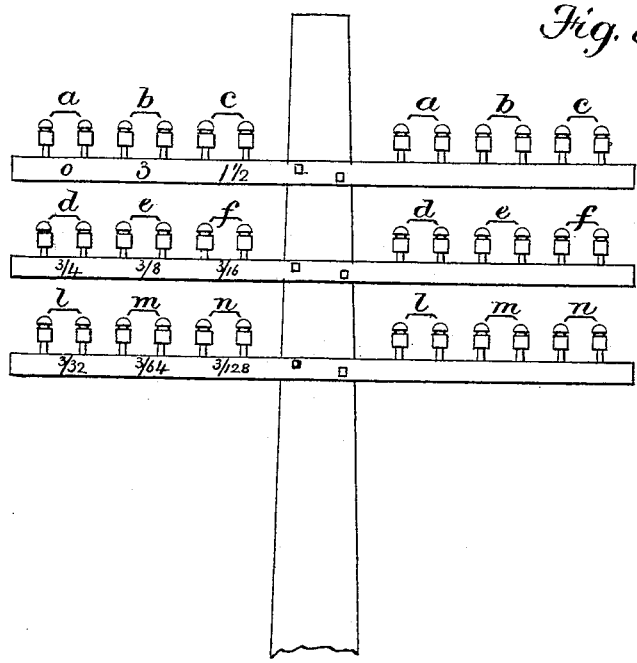
Figure 9:
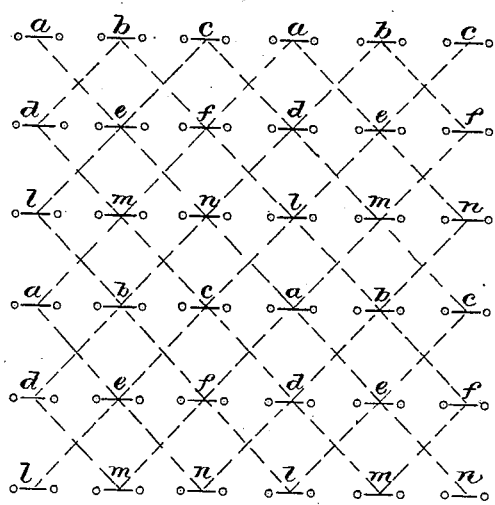

Figs. 3, 5, and 7 represent the arrangement of an actual line which has been constructed in accordance with the foregoing principles, and which by its operation demonstrates their correctness. Fig. 6 shows the same principles embodied in a slightly-modified form of construction, three classes of circuits only being utilized. In this case the element of distance, also, is utilized to prevent interference between the classes $c$. Figs. 8 and 9, on the other hand, exemplify symbolically and literally a modified construction in which the number of classes of transposed circuits is increased. This may, as hereinbefore indicated, be used in installations where the mutual induction is of an extraordinarily intense and persistent character.

As shown, three classes, $a$, $b$, and $c$, are each represented on the initial cross-arm. Three other classes, $d$, $e$, and $f$, are alternately disposed upon the next cross-arm, and three others, $l$, $m$, and $n$, on the third. The classes $a$, $b$, $c$, and $d$ may be identical in character with those hereinbefore represented by the same letters, and the succeeding classes involve each a constantly-increasing number of crossings in equal distances, the number of crossings in the circuits of each class for a given distance being, except with reference to class $a$, a multiple or a submultiple of the crossings in the neighboring lines in either direction. The fourth cross-arm, then, is made to duplicate the first. In this modification, while the same principle is involved, the number of classes of cross-connected circuits is increased, each circuit having two circuits neutral to each other interposed between itself and any other circuit of the same or of like class.

It will be understood that the braces shown over the pairs of insulators in Fig. 5 indicate that the pair so bracketed together is the pair upon which the two wires of a circuit are to be supported. Thus the two wires of circuit No. 1 may be supported upon the two insulators at the left-hand end of cross-arm No. 1, the two wires of circuit No. 2 on the immediately-adjoining insulators, and so on. I have stated that neutrality is obtained between two circuits by crossing the direct and return wires of one at a point or points opposite parallel or uncrossed portions of the other, and it is to be understood that the use of this principle is not restricted to two circuits immediately adjoining one another, since the conditions equally obtain and are equally complied with if we consider any two such circuits in a group—for example, circuit $a$ on the top cross-arm as one, and any of the circuits $b$, $c$, or $d$ as the other—and it should also be stated that these conditions are not violated by the circumstance that certain crossings in $c$ are opposite the crossings in $b$, or that certain crossings of the two wires of $d$ are opposite the crossings of $c$ and $b$, this being due to the fact that $c$ as well as $b$ is required to be neutral to $a$, and that $d$ has to be neutral to $a$ and $b$ as well as to $c$. Thus the crossings which in any two circuits are opposite one another, or at similar positions, are in every case referable to the relations of such circuits with a third.

Having now fully described my invention, I claim—

1. Three or more substantially parallel metallic electric circuits, the direct and return wires of two or more of which are so divided into sections by crossing at different points as to be inductively neutral to electrical changes in each of the other circuits.

2. A group of parallel metallic circuits supported on poles, each two circuits immediately adjacent in any direction—horizontally, vertically, or diagonally—being made inductively neutral to each other by causing the direct and return wires of one of them to cross or exchange places in such manner that the average distance of each wire of said crossed circuit from the two wires of the other shall be the same, substantially as described.

3. A group of metallic electric circuits comprising two parallel circuits reciprocally inductive upon each other and one or more interposed metallic electric circuits made inductively neutral to said reciprocally-inductive circuits, and, if more than one, to each other, by suitable crossings of their respective wires, substantially as described.

In testimony whereof I have signed my name to this specification, in the presence of two subscribing witnesses, this 3d day of May, 1888.

JOHN A. BARRETT.

Witnesses:
    THOS. DE LISLE LOCKWOOD,
    F. DE LYSLE SMITH.